US011609860B1

(12) United States Patent
Banerjee (10) Patent No.: US 11,609,860 B1
(45) Date of Patent: Mar. 21, 2023

(54) TECHNIQUES FOR GENERATING A SYSTEM CACHE PARTITIONING POLICY (71) Applicant: NVIDIA CORPORATION, Santa Clara, CA (US)

(72) Inventor: Arnab Banerjee, Berkeley, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 0 days.

(21) Appl. No.: 17/557,511

(22) Filed: Dec. 21, 2021

(51) Int. Cl.
*G06F 12/0895* (2016.01)
*G06F 12/0871* (2016.01)
*G06F 15/78* (2006.01)
*G06F 9/50* (2006.01)
*G06F 12/0831* (2016.01)

(52) U.S. Cl.
CPC ........ *G06F 12/0895* (2013.01); *G06F 9/5016* (2013.01); *G06F 12/0833* (2013.01); *G06F 12/0871* (2013.01); *G06F 15/7807* (2013.01)

(58) Field of Classification Search
CPC ............... G06F 9/5016; G06F 12/0833; G06F 12/0871; G06F 12/0895; G06F 15/7807
See application file for complete search history.

(56) References Cited

U.S. PATENT DOCUMENTS

| 2012/0124269 | A1* | 5/2012 | Garg | G06F 1/3275 |
| | | | | 711/6 |
| 2018/0120919 | A1* | 5/2018 | Hwang | G06F 9/30101 |
| 2020/0341536 | A1* | 10/2020 | Waugh | G06F 12/0895 |
| 2021/0034527 | A1* | 2/2021 | Klingauf | G06F 12/0895 |

* cited by examiner

*Primary Examiner* — Aracelis Ruiz
(74) *Attorney, Agent, or Firm* — Artegis Law Group, LLP (57) ABSTRACT

In various embodiments, a computing system includes, for example, a plurality of processing units that share access to a system cache. A cache management application receives, for example, resource savings information for each processing unit. The resource savings information indicates, for example, amounts of a resource (e.g., power) that are saved when different units of the system cache are allocated to a processing unit. The cache management application determines, for example, the number of units of system cache to allocate to each processing unit based on the received resource savings information.

20 Claims, 5 Drawing Sheets

TECHNIQUES FOR GENERATING A SYSTEM CACHE PARTITIONING POLICY

BACKGROUND

Field of the Various Embodiments

Embodiments of the present disclosure relate generally to computer memory and processing and, more specifically, to techniques for generating a system cache partitioning policy.

Description of the Related Art

Various processing units of a computer system, such as a central processing unit (CPU) or graphics processing unit (GPU), have access to a cache memory for storing temporary copies of data. An application executing on the processing unit can cache data in the corresponding cache memory for future access. For example, an application could read data from a storage device and store a copy of the data in cache memory. Subsequently, if the application needs the same data, then the application can read the cached data from the cache memory rather than from the storage device. Because accessing cache memory is faster than reading data from a storage device or re-computing a value, using cached data allows the hardware unit to increase processing throughput. When the cache memory is full, in order to cache additional data, some of the existing data is removed from the cache memory and replaced with the newly-added data.

One type of computer system is a system on a chip (SOC), which integrates multiple different processing units on a single chip, such as one or more CPUs, GPUs, and/or other types of data processing units. The system on a chip can include a system cache that is accessible to most, if not all, of the different processing units. Each processing unit can cache data to the system cache and read cached data that was stored by other processing units. For example, a GPU could cache the results of a computation in the system cache and a CPU could then read the results of the computation, rather than waiting for the GPU to transmit the results of the computation. Therefore, the system cache can also allow processing units to efficiently transfer data to other processing units.

However, one problem with sharing the system cache between multiple processing units is that the total amount of cache needed by the multiple processing units usually exceeds the size of the system cache. As a result, when an application caches data in the system cache, the data is often quickly removed from the cache by other applications that are also caching data in the system cache. However, if the data is missing from the cache when the application needs the data, then the application has to re-obtain the data, e.g., read the data from a different storage device or storage location.—Therefore, the different processing units of the system on a chip cannot effectively leverage the system cache to improve processing speeds.

Additionally, SOCs are frequently used in battery-powered devices, such as mobile phones or laptops, where low power consumption is desirable. Reading data from a storage device or recomputing data uses more power compared to reading data from the system cache. Therefore, inefficient sharing of the system cache by the different processing units also results in increased power consumption.

Furthermore, in some battery-powered and/or non-battery-powered devices, an SOC is not permitted to consume more than a fixed power budget. In such cases, reducing the amount of power consumed by the different processing units at a given performance level allows the different processing units to operate at a higher performance level, while increasing the amount of power consumed by the different processing units results in the different processing units operating at a lower performance level, e.g., at lower processing speeds.

As the foregoing illustrates, what is needed in the art are more effective ways to manage a system cache shared by multiple processing units.

SUMMARY

One embodiment of the present disclosure sets forth a computer-implemented method for managing a system cache shared by a plurality of processing units. The method includes receiving, for each processing unit included in the plurality of processing units, resource savings information that specifies, for different units of system cache, corresponding amounts of resources saved when the different units of system cache are allocated to the processing unit. The method further includes computing, for each processing unit included in the plurality of processing units, a number of units of system cache to allocate to the processing unit based at least on the resource savings information associated with the plurality of processing units.

At least one technical advantage of the disclosed techniques relative to the prior art is that, with the disclosed techniques, access to a system cache is more effectively shared between multiple processing units. In particular, a different portion of the system cache is assigned to each processing unit. Each processing unit has read access to other portions of the system cache, but only writes data to its assigned portion of the system cache. Accordingly, each processing unit does not write data to, or overwrite data stored in, portions of the system cache assigned to other processing units. Therefore, cached data is removed or overwritten less frequently compared to previous approaches, which also results in reduced power consumption compared to previous approaches. Furthermore, using the disclosed techniques, an optimal size of the portion of system cache assigned to each processing unit is determined, such that the overall power consumption of the system is minimized. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
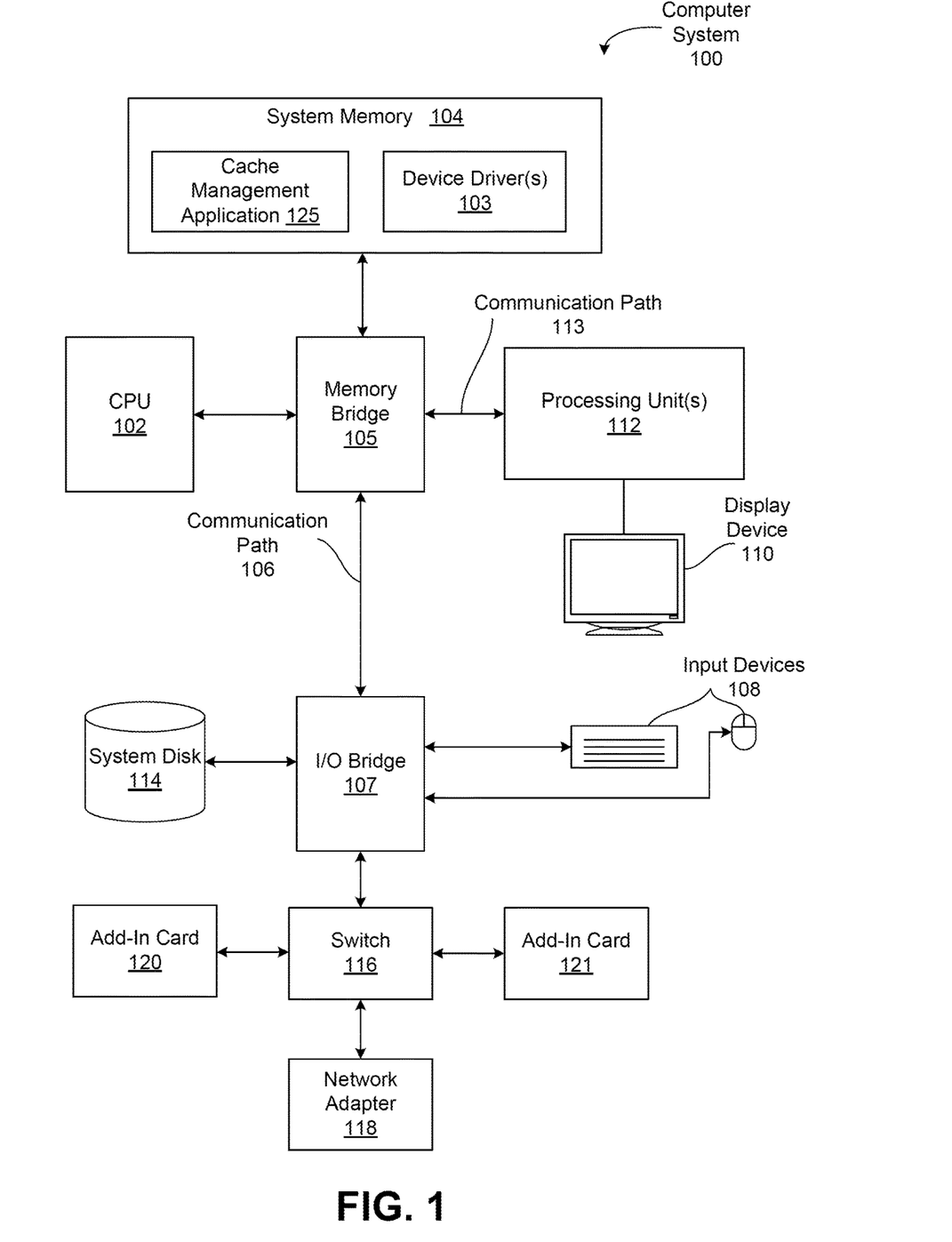
FIG. 1 is a block diagram illustrating a computer system configured to implement one or more aspects of the various embodiments.

FIG. 1 is a block diagram illustrating a computer system 100 configured to implement one or more aspects of the present invention, according to one embodiment. As shown, computer system 100 includes, without limitation, a central processing unit (CPU) 102 and a system memory 104 coupled to one or more processing units 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add in cards 120 and 121.

As also shown, I/O bridge 107 is coupled to a system disk 114 that may be configured to store content and applications and data for use by CPU 102 and the one or more processing units 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid-state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point to point communication protocol known in the art.

In some embodiments, the one or more processing units 112 include one or more graphics processing units that deliver pixels to a display device 110 that may be any conventional cathode ray tube, liquid crystal display, light-emitting diode display, or the like. The one or more graphics processing units incorporate circuitry optimized for graphics and video processing, including, for example, video output circuitry. Such circuitry may be incorporated across one or more parallel processing units (PPUs) included within the one or more graphics processing units. In some embodiments, the one or more processing units 112 include processing units that incorporate circuitry optimized for general purpose and/or compute processing. Again, such circuitry may be incorporated across one or more PPUs included within the processing units that are configured to perform such general purpose and/or compute operations. In some embodiments, the one or more PPUs included within a processing unit 112 may be configured to perform graphics processing, general purpose processing, and compute processing operations.

System memory 104 includes one or more device drivers 103 configured to manage the processing operations of the one or more processing units 112 and/or one or more PPUs within the one or more processing units 112. The system memory 104 also includes a plurality of software applications that execute on the CPU 102, such as cache management application 125. As explained in further detail below, cache management application 125 analyzes bandwidth saved and/or power saved information received from the one or more device drivers 103 and generates a partition policy for a system cache.

In various embodiments, one or more processing units 112 may be integrated with one or more other the other elements of FIG. 1 to form a single system. For example, as discussed in further detail below, the one or more processing units 112 can be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, the one or more processing units 112 may be connected to I/O bridge 107 or directly to CPU 102, rather than to memory bridge 105. In still other embodiments, I/O bridge 107 and memory bridge 105 may be integrated into a single chip instead of existing as one or more discrete devices.

System Cache Overview

Figure 2:
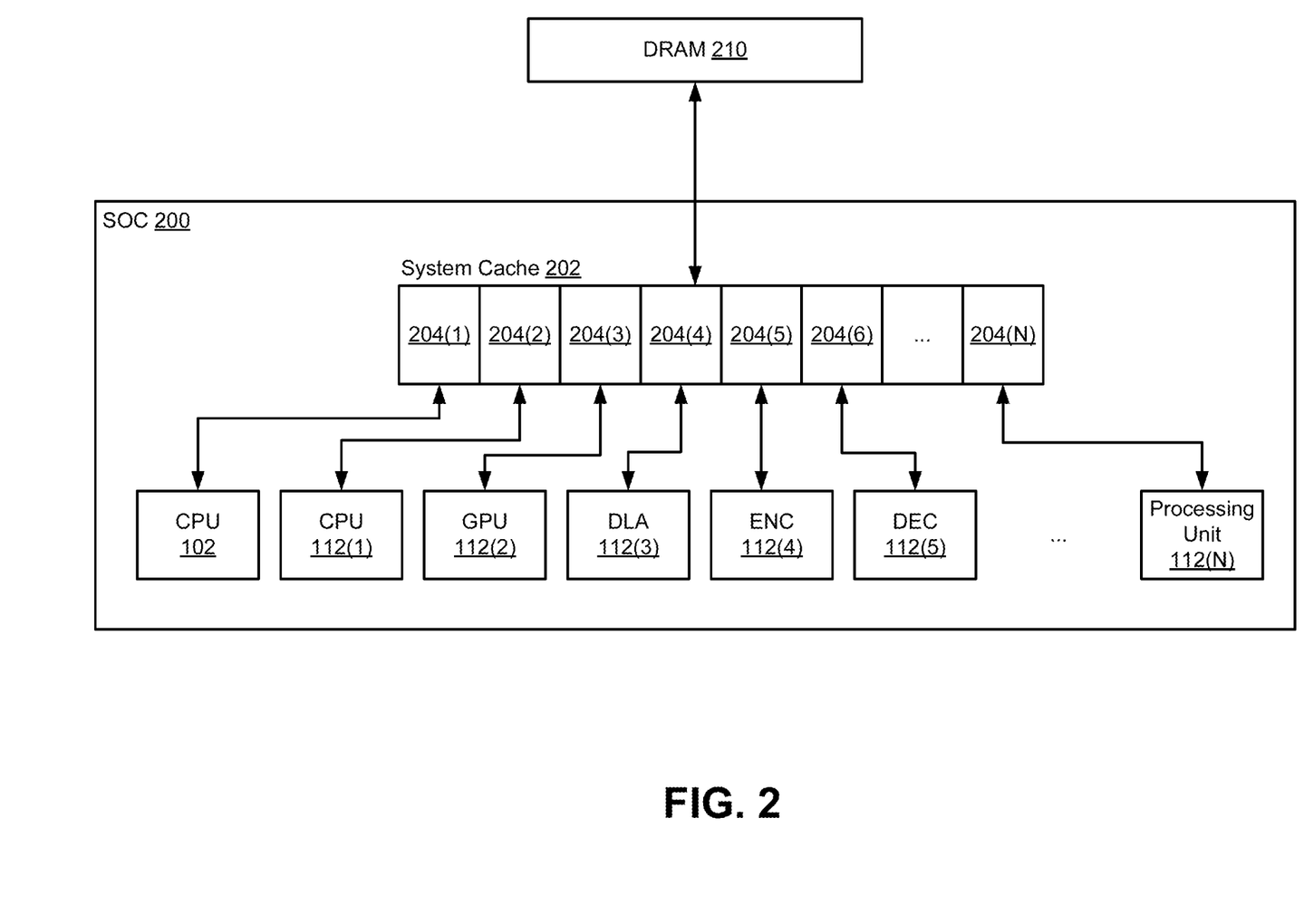
FIG. 2 is a block diagram of the CPU and the one or more processing units of FIG. 1 integrated in a system on a chip (SOC), according to various embodiments.

FIG. 2 is a block diagram of a system on a chip (SOC) 200 that includes the CPU 102 and the one or more processing units 112 of FIG. 1, according to various embodiments. The CPU 102 and one or more processing units 112(1)-(N) are integrated on a single chip. As shown, the one or more processing units 112 include an additional CPU 112(1), a graphics processing unit (GPU) 112(2), a deep learning accelerator (DLA) 112(3), an encoding accelerator (ENC) 112(4), a decoding accelerator (DEC) 112(5). Although FIG. 2 depicts N processing units 112, the SOC 200 may include any number of processing units 112, including more or fewer processing units. Additionally, the SOC 200 may include different type(s) of processing units 112 not illustrated in FIG. 2.

In some embodiments, the CPU 102 processes data asynchronously from the one or more processing units 112. Additionally, each of the one or more processing units 112(1)-(N) can process data asynchronously from the CPU 102 and the other processing units 112. In some embodiments, each processing unit 112 is configured for general-purpose processing, compute processing, and/or specialized processing. For example, GPU 112(2) could be configured to implement a graphics rendering pipeline to perform various operations related to generating pixel data based on graphics data supplied by CPU 102, one or more other processing units 112, and/or system memory 104.

As shown in FIG. 2, the SOC 200 includes a system cache 202 and is coupled to a dynamic random-access memory (DRAM) 210. The CPU 102 and the one or more of processing units 112(1)-(N) have access to the system cache 202 and DRAM 210. The system cache 202 and DRAM 210 can be used to store and update data generated by each of the CPU 102 and the one or more processing units 112(1)-(N). Additionally, as shown, system cache 202 is divided into a plurality of partitions 202(1)-(N). Each partition is assigned to a corresponding processing unit, such as CPU 102 or one of the one or more processing units 112. Although FIG. 2 depicts the same number of partitions as processing units, the system cache 202 may be divided into any number of partitions and each partition may be assigned to any number of processing units.

In some embodiments, assigning a partition to a processing unit includes granting the processing unit read and write access to the portion of the system cache included in the partition. Assigning a partition to a processing unit can also include denying write access to other processing units. For example, partition 204(1) is assigned to CPU 102. CPU 102 has read and write access to portion 204(1). The one or more processing units 112, such as CPU 112(1), GPU 112(2), and the like, do not have write access to portion 204(1).

In some embodiments, one or more processing units that are not assigned to a partition retain read access to the portion of the system cache included in the partition. For example, partition 204(3) is assigned to GPU 112(2). GPU 112(2) can store output data to partition 204(3). CPU 102 or the other processing units 112 could read the output data generated by GPU 112(2) from partition 204(3). Similarly, GPU 112(2) could read the output data generated by CPU 1092 or the other processing units 112 from their assigned partition. In this way, the CPU 102 and the one or more processing units 112 can transmit data to one another via the system cache 202.

In some embodiments, if data cached in system cache 202 is evicted from the system cache 202, then the data is stored in DRAM 210. When CPU 102 or a processing unit 112 requires data, the CPU 102 or the processing unit 112 first determines whether the data is in system cache 202. If the data is cached in system cache 202, then the CPU 102 or processing unit 112 reads the data from system cache 202. If the data is not cached in system cache 202, then the CPU 102 or processing unit 112 determines whether the data is in DRAM 210. If the data is stored in DRAM 210, then the CPU 102 or processing unit 112 reads the data from DRAM 210.

As discussed in further detail below, reading data from DRAM 210 consumes more power compared to reading data from system cache 202. Therefore, reducing the number of times the CPU 102 and the one or more processing units 112 read data from DRAM 210 rather than from system cache 202 reduces the amount of power consumed during operation of the system 100.

System Cache Partition Policy

Figure 3:
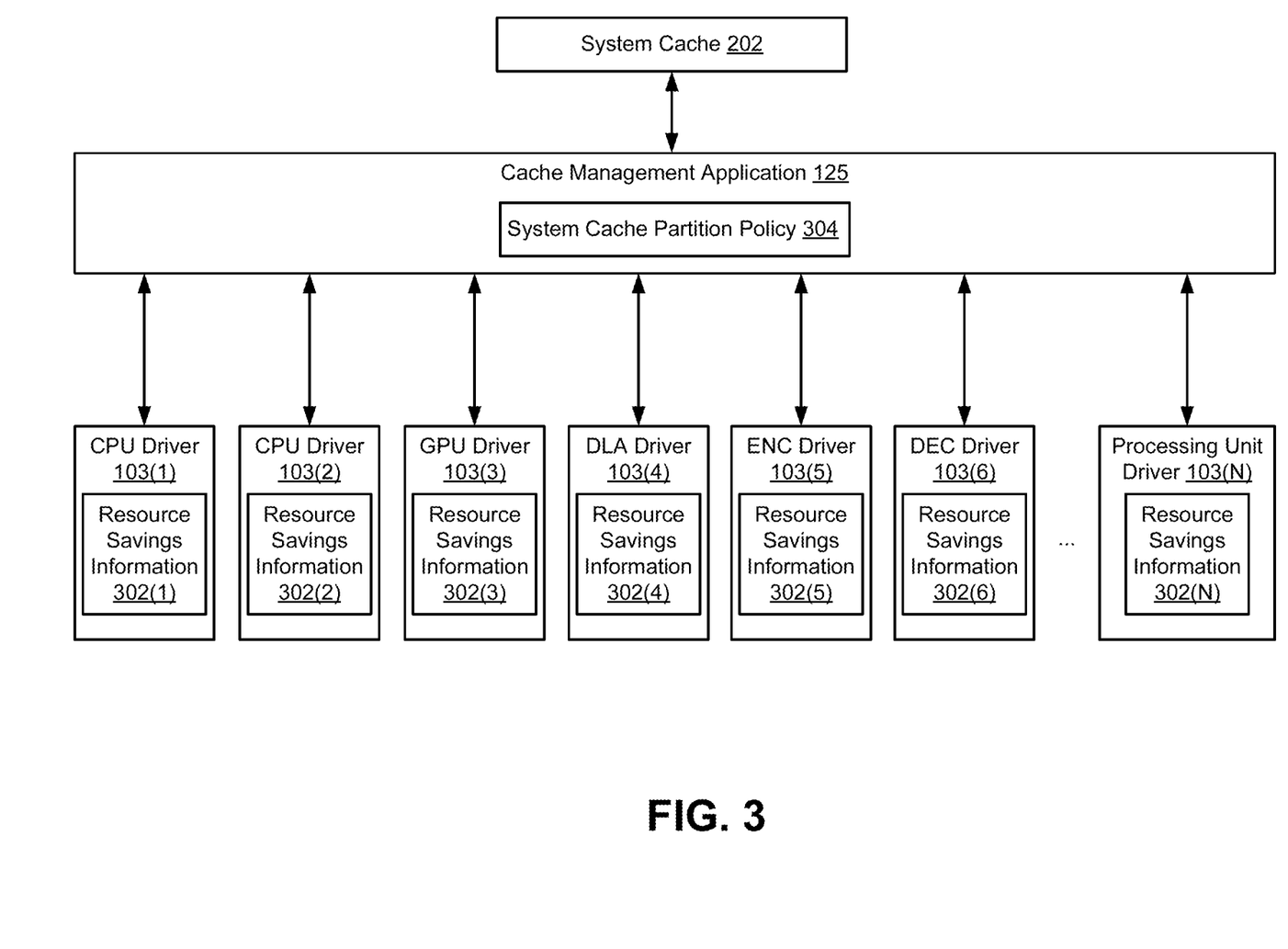
FIG. 3 is a more detailed illustration of the cache management application and the one or more drivers of FIG. 1, according to various embodiments.

FIG. 3 is a more detailed illustration of the cache management application 125 and the one or more drivers 103 of FIG. 1, according to various embodiments. The one or more drivers include one or more drivers that correspond to the CPU 102 and the one or more processing units 112. As shown in FIG. 3, the one or more drivers 103 include a CPU driver 103(1), CPU driver 103(2), GPU driver 103(3), DLA driver 103(4), ENC driver 103(5), DEC driver 103(6), and processing unit driver 103(N) corresponding to CPU 102, CPU 112(1), GPU 112(2), DLA 112(3), ENC 112(4), DEC 112(5), and processing unit 112(N), respectively. Each driver is configured to manage the processing operations of the corresponding processing unit.

In some embodiments, each driver is configured to compute and/or store resource savings information 302 associated with the corresponding processing unit. The resource savings information 302 indicates an amount of resource that is saved for each unit (e.g., megabyte) of system cache that is allocated to the processing unit. The resource savings information 302 includes, for example, power saved information and/or bandwidth saved information. Bandwidth saved information for a corresponding processing unit indicates an amount of DRAM bandwidth saved for each unit of system cache that the processing unit is allocated. Power saved information for a corresponding processing unit indicates an amount of power saved by the processing unit itself for each unit of system cache that the processing unit is allocated.

In some embodiments, the bandwidth saved information includes one or more functions that indicate the amount of DRAM bandwidth saved for different units of system cache that are allocated to the processing unit. For example, the bandwidth saved information could include a function that maps different units of system cache allocated to the processing unit to different amounts of DRAM bandwidth used by the processing unit. As another example, the bandwidth saved information could include a function that maps different amounts of system cache allocation increases or decreases different amounts of DRAM bandwidth saved by the processing unit or additional DRAM bandwidth used by the processing unit, respectively. The functions could be used to calculate, for a given cache size that is assigned to the processing unit, the corresponding amount of DRAM bandwidth that is used. Accordingly, the function could also be used to calculate the difference in DRAM bandwidth used, e.g., the amount of bandwidth saved or additional bandwidth needed, for two different system cache sizes.

In some embodiments, the power saved information includes one or more functions that indicate the amount of power saved for different units of system cache that are allocated to the processing unit. For example, the power saved information could include a function that maps different units of system cache allocated to the processing unit to different amounts of power consumed by the processing units (e.g., milliwatts or watts) for a given level of processing unit performance. The function could be used to calculate, for a given cache size that is assigned to the processing unit, the corresponding amount of power that is consumed to maintain a current performance level of the processing unit. As another example, the power saved information could include a plurality of functions, where each function maps different amounts of power consumption to different performance levels for a given system cache size allocated to the processing unit. The functions could be used to calculate, for a given performance level, the difference in power consumption for two different system cache sizes assigned to the processing unit. Accordingly, these functions could also be used to calculate the difference in power used, e.g., the amount of power saved or additional power needed, for two different system cache sizes.

Figure 4A:
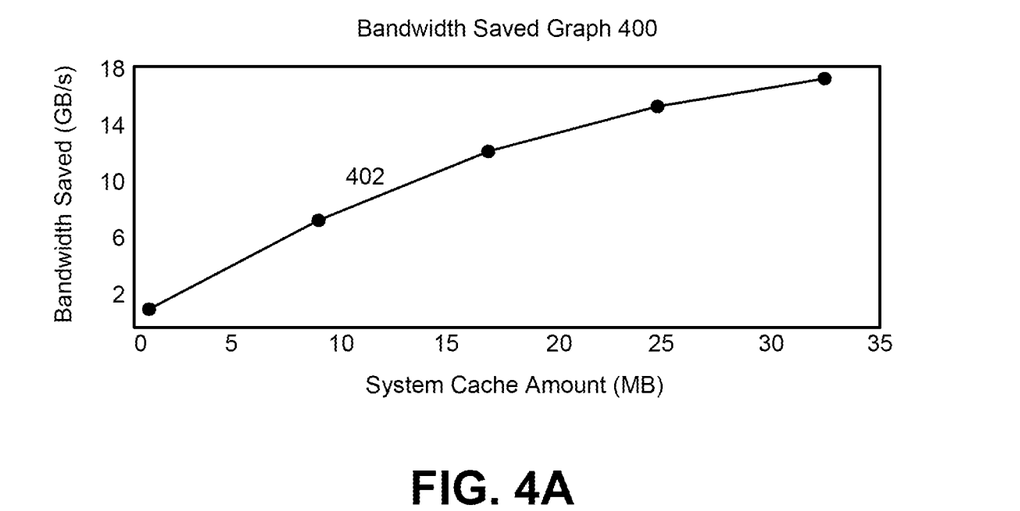
FIG. 4A illustrates an exemplar bandwidth saved graph associated with a processing unit of FIG. 2, according to various embodiments.

FIG. 4A illustrates an exemplar bandwidth saved graph 400 associated with a processing unit of FIG. 2, according to various embodiments. Bandwidth saved graph 400 is a graph corresponding to a bandwidth saved function for a processing unit. As shown in FIG. 4A, line 402 indicates, for different amounts of system cache that is allocated to the processing unit, the corresponding amount of DRAM bandwidth saved by the processing unit.

Figure 4B:
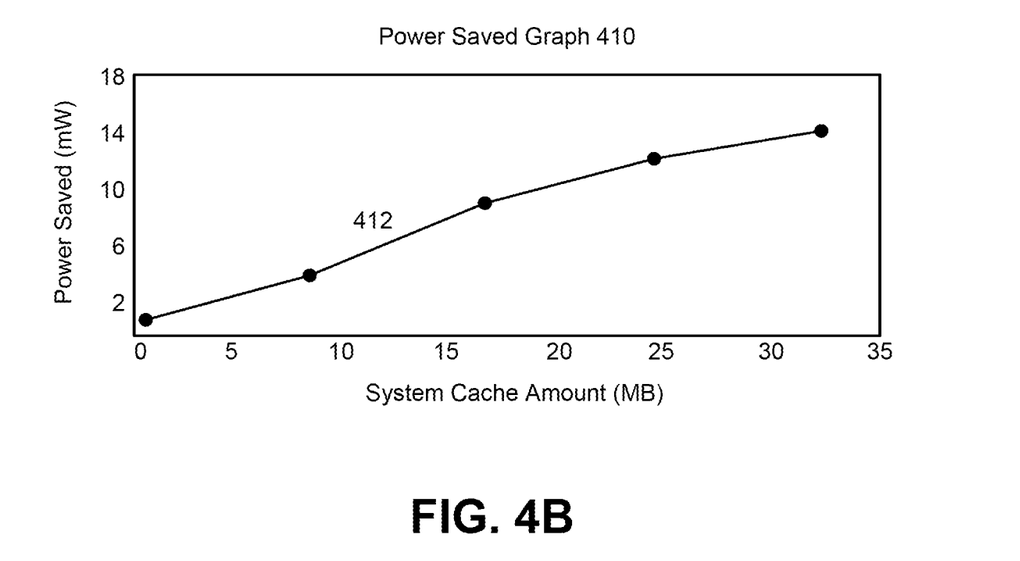
FIG. 4B illustrates an exemplar power saved graph associated with a processing unit of FIG. 2, according to various embodiments.

FIG. 4B illustrates an exemplar power saved graph 410 associated with a processing unit of FIG. 2, according to various embodiments. Power saved graph 400 is a graph corresponding to a power saved function for a processing unit. As shown in FIG. 4B, line 412 indicates, for different units of system cache that is allocated to the processing unit, the corresponding amount of power saved by the processing unit. In some embodiments, the power saved graph 400 corresponds to a specific level of performance for the processing unit. The metric used to determine the level of performance may vary depending on the type of processing unit. For example, the level of performance for GPU 112(2) could be a number of frames per second (FPS).

As illustrated in FIGS. 4A and 4B, the bandwidth saved function and the power saved function are monotonically non-decreasing functions. The amount of bandwidth saved and the amount of power saved increases as the size of system cache allocated to a processing unit increases. However, the amount by which the amount of bandwidth saved and/or the amount of power saved is incremented for each additional unit of system cache can vary. As illustrated in FIGS. 4A and 4B, the slope of the lines 402 and 412 varies at different points on the bandwidth saved graph 400 and power saved graph 410, respectively.

In some embodiments, the resource savings information 302 computed and/or stored by a processing unit is based on a unit type of the processing unit. For example, the total amount of power saved by a processing unit of a first unit type, could correlate to the amount of DRAM bandwidth that is saved by allocating additional units of system cache to the processing unit, the total amount of power saved by a processing unit of a second unit type could correlate to the amount of processing time and/or processing power that is saved by allocating additional units of system cache to the processing unit, and the total amount of power saved by a processing unit of a third unit type could correlate to both the amount of DRAM bandwidth and the amount of processing time and/or processing power that is saved by allocating additional units of system cache to the processing unit. A processing unit of the first unit type could generate only bandwidth saved information, a processing unit of the second unit type could generate only power saved information, and a processing unit of the third unit type could generate both bandwidth saved and power saved information.

For example, referring to FIG. 2, each of the CPU 102, CPU 112(1), GPU 112(2), and DLA 112(3) could be a processing unit type where the total amount of power saved correlates to both the amount of DRAM bandwidth and the amount of processing time and/or power that is saved by allocating additional units of system cache to the processing unit, while ENC 112(4), and DEC 112(5) are a processing unit type where the total amount of power saved correlates to the amount of DRAM bandwidth that is saved by allocating additional units of system cache to the processing unit. The resource savings information 302 computed and/or stored by each of CPU 102, CPU 112(1), GPU 112(2), and DLA 112(3) could include both bandwidth saved information and power saved information, while the resource savings information 302 computed and/or stored by each of ENC 112(4) and DEC 112(5) could include only bandwidth saved information.

As shown in FIG. 3, each processing unit driver 103 transmits resource savings information 302 to cache management application 125. Cache management application 125 receives the resource savings information 302 from each processing unit and generates a cache partition policy 304. The cache partition policy 304 indicates, for each processing unit (e.g., CPU 102 and the one or more processing units 112), a number of units of system cache 202 to allocate to the processing unit.

In some embodiments, to generate the cache partition policy 304, cache management application 125 determines, for each processing unit, the total amount of power saved for different units of system cache allocated to the processing unit. In some embodiments, cache management application 125 generates a function that maps the different units of system cache allocated to different amounts of power saved. In some embodiments, the amount of bandwidth saved increases with each additional unit of system cache that a processing unit is allocated. Similarly, the amount of power saved increases with each additional unit of system cache that a processing unit is allocated. In such cases, the function corresponding to the total power saved for each unit of system cache allocated to the processing unit is a monotonically non-decreasing function. That is, the total amount of power saved increases as the number of units of system cache allocated to the processing unit increases.

In some embodiments, the total amount of power saved by a processing unit when allocated additional units of system cache is based on a unit type of the processing unit. As described above with respect to the resource savings information 302, the total amount of power saved by a processing unit could correlate to the amount of DRAM bandwidth that is saved by allocating additional units of system cache to the processing unit, the amount of processing time and/or processing power that is saved by allocating additional units of system cache to the processing unit, or both, depending on the unit type.

In some embodiments, the cache management application 125 determines the total power saved for a processing unit based on the unit type of the processing unit. For example, if a processing unit is the first unit type, then the cache management application 125 could determine the total power saved for the processing unit based on bandwidth saved information for the processing unit. If the processing unit is the second unit type, then the cache management application 125 could determine the total power saved for the processing unit based on power saved information for the processing unit.

In some embodiments, the total amount of power saved by a processing unit when allocated additional units of system cache corresponds to the amount of power used by reading data from the DRAM 210 instead of from system cache 202. The processing unit driver 103 generates and/or stores bandwidth saved information and transmits the bandwidth saved information to cache management application 125. Cache management application 125 computes a total amount of power saved for the processing unit based on the bandwidth saved information received from the processing unit driver 103. In some embodiments, the bandwidth saved information includes a bandwidth saved function that associates bandwidth saved to different amounts of system cache assigned to the processing unit. Cache management application 125 generates a function corresponding to the total amount of power saved for the processing unit by multiplying the bandwidth saved function by the power saved per unit of DRAM bandwidth. In some embodiments, the power saved per unit of DRAM bandwidth is based on the operating frequency and voltage of the system cache 202 and DRAM 210. In some embodiments, cache management application 125 stores a mapping that indicates, for each unit of DRAM bandwidth, the amount of power saved and/or consumed. The mapping could be associated with the specific DRAM 210 that is included in the system 100 and derived when the specific DRAM 210 is designed and/or by simulating operation of the DRAM 210. Cache management application 125 determines the amount of power consumed by each of the system cache 202 and DRAM 210 at different bandwidths for a given operating frequency and voltage.

In some embodiments, the total amount of power saved by a processing unit when allocated additional units of system cache corresponds to the amount of power used by the processing unit, such as for performing computations or waiting to access data in the system cache 202 or DRAM 210. The processing unit driver 103 generates and/or stores power saved information and transmits the power saved information to cache management application 125. Cache management application 125 computes a total amount of power saved for the processing unit based on the power saved information received from the processing unit driver 103. In some embodiments, the power saved information includes a power saved function that associates power saved by the processing unit to different amounts of system cache assigned to the processing unit. Cache management application 125 uses the power saved function as the function corresponding to the total amount of power.

In some embodiments, the total amount of power saved by a processing unit when allocated additional units of system cache corresponds to both the amount of power used by reading data from the DRAM 210 and the amount of power used by the processing unit, such as for performing computations. The processing unit driver 103 generates and/or stores bandwidth saved information and power saved information and transmits the bandwidth saved information 302 and the power saved information to cache management application 125. Cache management application 125 computes a total amount of power saved for the processing unit based on both the bandwidth saved information and the power saved information received from the processing unit driver 103. In some embodiments, the bandwidth saved information includes a bandwidth saved function that associates bandwidth saved to different amounts of system cache assigned to the processing unit and the power saved information includes a power saved function that associates power saved by the processing unit to different amounts of system cache assigned to the processing unit. Cache management application 125 generates a function corresponding to the total amount of power saved for the processing unit by multiplying the bandwidth saved function by the power saved per unit of DRAM bandwidth, as discussed above, and adding the power saved function to the result.

After determining the power saved for the CPU 102 and the one or more processing units 112, cache management application 125 generates a cache partition policy 304 based on the total power saved for each processing unit. Cache management application 125 determines a number of units of system cache to assign to each processing unit that maximizes the total amount of power saved across the CPU 102 and the one or more processing units 112. In some embodiments, cache management application 125 determines the total amount of power saved for each processing unit by generating a function corresponding to the total amount of power saved for different system cache sizes available to the processing unit. Cache management application 125 formulates an optimization function based on the functions corresponding to the total amount of power saved for the different processing units. Cache management application 125 solves the optimization function under the constraint that the sum of the system cache allocated to each processing unit equals the total system cache size and that the system size cache allocated to each processing unit is greater than or equal to zero. Example equations representing the optimization problem and the constraints are given by equations (1a) and (1b):

$$\text{Maximize } O = \Sigma_{s \in S} U_s(x_s) \quad (1a)$$

$$\text{Subject to } \Sigma_{s \in S} x_s = C \text{ and } x_s \geq 0 \, \forall s \in S \quad (1b)$$

In equations (1a) and (1b), S represents a set of processing units, O represents the total power saved by the system across the set of processing units, $U_s(x_s)$ represents the total power saved by a unit s when allocated a system cache size $x_s$, and C represents the total system cache size available on SOC 200. As shown in equations (1a) and (1b), the total power saved by the system across the set of processing units should be maximized, subject to the constraints that the sum of the system cache size across the set of processing units is equal to the total system cache size available on SOC 200 and that the system cache size allocated to each processing unit s is greater than or equal to 0.

In some embodiments, the optimization problem described by equations (1a) and (1b) is solved by formulating an optimization function using the Kuhn-Tucker optimization method and solving the optimization function. An example optimization function is given by equation (2):

$$L = \Sigma_{s \in S} U_s(x_s) + \lambda(\Sigma_{s \in S} x_s - C) - \Sigma_{s \in S} \mu_s x_s \quad (2)$$

In equation (2), L represents a Lagrangian function, $U_s(x_s)$ represents the total power saved by a unit s when allocated a system cache size $x_s$, and C represents the total system cache size available on SOC 200. Additionally, in equation (2), $\lambda$ and $\mu_s$ represent Kuhn-Tucker multipliers for the Lagrangian function L. Cache management application 125 solves the optimization function to find values for each $x_s$. The system of equations for solving the optimization function shown in equation (2) is given by equations (3A) and (3B):

$$\frac{\partial L}{\partial x_s} = U'_s(x_s) + \lambda - \mu_s = 0 \quad (3A)$$

The system of equations shown in equations (3A) and (3B) is solved for each processing unit s, e.g., for each of CPU 102 and the one or more processing units 112 to determine the system cache partition size for each processing unit that maximizes the total power saved across all the processing units s ∈ S. Cache management application 125 can solve the system of equations using any technically feasible simultaneous equation solving algorithms. Per the Kuhn-Tucker method, if the inequality constraints are inactive (i.e., the optimal solution has a system cache size greater than 0 allocated to every processing unit), then $\mu_s$ is equal to 0. For a single $\lambda$, then solving the system of equations for all the processing units implies determining the equal gradient points on the total power saved function of every processing unit. Because the total power saved functions are monotonically non-decreasing, assigning more units of system cache to a given processing unit will save an amount of power that is less than or equal to the amount of power added for the other processing units.

After generating the cache partition policy 304, cache management application 125 causes the system cache 202 to be partitioned into a plurality of partitions according to the cache partition policy 304. Each partition included in the plurality of partitions is assigned to a processing unit indicated by the cache partition policy 304. In some embodiments, cache management application 125 partitions the system cache 202 and assigns each partition to a different processing unit. In some embodiments, cache management application 125 transmits the cache partition policy 304 to another application that partitions the system cache 202 and/or assigns the partitions to the different processing units.

In some embodiments, cache management application 125 is configured to generate an updated cache partition policy 304 when characteristics of the CPU 102, processing units 112, SOC 200, and/or DRAM 210 change. For example, cache management application 125 could request updated resource savings information 302 from the drivers 103 when cache management application 125 determines that at least one of the frequency of DRAM 210, the frequency of the memory on which system cache 202 resides, the voltage of DRAM 210, the voltage of the memory on which system cache 202 resides, the system temperature, or workload assigned to the CPU 102 or one of the processing units 112 has changed. In some embodiments, a processing unit driver 103 determines that the workload assigned to the corresponding processing unit has changed and transmits resource savings information 302 to the cache management application 125. In response to receiving resource savings information 302 from one or more processing unit drivers 103, cache management application 125 generates an updated cache partition policy 304. In some embodiments, cache management application 125 generates and solves an updated optimization function.

Typical methods for partitioning a cache memory include dividing the cache evenly between various applications that share the cache or based on one or more pre-determined criteria. One problem with these approaches is that, for a system cache such as system cache 202, if the system cache is not partitioned effectively, then the different processing units are still unable to effectively utilize the system cache. For example, if a partition is small compared to the amount of cached data generated by a processing unit, then the processing unit will frequently fill the partition and have to remove and replace cached data. As another example, if a partition is large compared to the amount of cached data generated by a processing unit, then portions of the system cache will remain unused or infrequently used, even when other processing units would benefit from having additional space in the system cache. As discussed above, inefficient sharing of the system cache by the different processing units also results in increased power consumption. If the computer system is a power-constrained system, then inefficient sharing of the system cache by the different processing units results in reduced performance and/or processing speeds of the different processing units. In contrast, with the disclosed techniques, the size of the partitions assigned to the different processing units are selected such that the amount of power, e.g., battery power, consumed by the system as a whole is reduced. Accordingly, with the disclosed techniques, the computer system utilizes less battery power and can sustain a longer battery life compared to prior systems. Similarly, if the computer system is a power-constrained system, then the processing speed and/or performance of the computer system is increased.

Additionally, by using mathematical optimization (e.g., as shown in equations 1-3B) to determine the sizes of the partitions assigned to the different processing units, the optimal partition size for each partition is identified such that the overall power consumption of the system is minimized. That is, selecting other sizes for the partitions assigned to the different processing units would result in a higher overall power consumption of the system compared to the overall power consumption of the system when using the partition sizes selected using the disclosed techniques.

Figure 5:
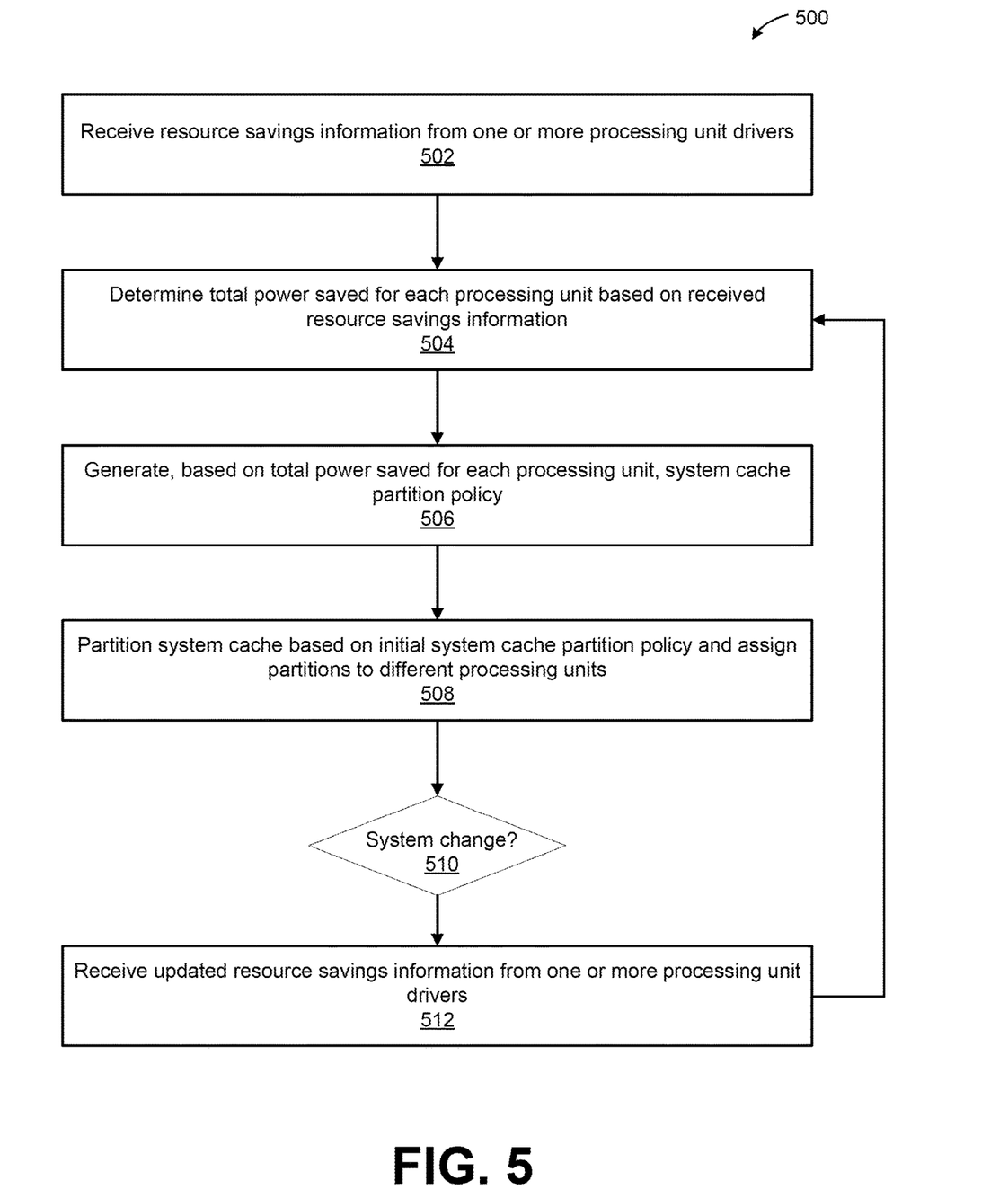
FIG. 5 is a flowchart of method steps for automatically generating a system cache partition policy, according to various embodiments.

FIG. 5 is a flowchart of method steps for automatically generating a system cache partition policy 304, according to various embodiments. Although the method steps are described with reference to the systems of FIGS. 1-3, persons skilled in the art will understand that any system configured to implement the method steps, in any order, falls within the scope of the present invention.

As shown in FIG. 5, a method 500 begins at step 502, where a cache management application 125 receives resource savings information 302 from one or more processing unit drivers, such as processing unit drivers 103(1)-(N). In various embodiments, the resource savings information 302 includes bandwidth saved information and/or power saved information. The bandwidth saved information for a processing unit indicates the amount of DRAM bandwidth saved for different amounts of system cache that are allocated to the processing unit. In some embodiments, the bandwidth saved information includes a function that maps different units of system cache allocated to the processing unit to different amounts of DRAM bandwidth saved by the processing unit. The power saved information for a processing unit indicates the amount of power saved for different amounts of system cache that are allocated to the processing unit. In some embodiments, the power saved information includes a function that maps different units of system cache allocated to the processing unit to different amounts of power bandwidth saved by the processing unit.

In some embodiments, the type of information received from a processing unit driver is based on a unit type of a corresponding processing unit. If the total power saved by allocating additional units of system cache to a processing unit correlates to the amount of DRAM bandwidth that is saved by allocating the additional units of system cache, then the cache management application 125 receives bandwidth saved information from the driver of the processing unit. If the total power saved by allocating additional units of system cache to a processing unit correlates to the amount of power that is saved by allocating the additional units of system cache, then the cache management application 125 receives power saved information from the driver of the processing unit. Accordingly, when transmitting the resource savings information 302, some processing unit drivers could transmit only bandwidth saved information, some processing unit drivers could transmit only power saved information, and some processing unit drivers could transmit both bandwidth saved information and power saved information.

At step 504, the cache management application 125 determines a total power saved for each processing unit based on the resource savings information 302 (e.g., bandwidth saved information and/or the power saved information) received from the corresponding processing unit driver. Determining the total power saved for each processing unit is performed in a manner similar to that discussed above with respect to cache management application 125.

In some embodiments, determining the total power saved for each processing unit includes generating a total power saved function that maps different units of system cache allocated to the processing unit to different amounts of total power saved by the processing unit. If the cache management application 125 received bandwidth saved information from a processing unit, then cache management application 125 generates the total power saved function based on the bandwidth saved information. If the cache management application 125 received power saved information from a processing unit, then cache management application 125 generates the total power saved function based on the power saved information. If the cache management application 125 received both bandwidth saved information and power saved information from a processing unit, then cache management application 125 generates the total power saved function based on the bandwidth saved information and the power saved information.

At step 506, the cache management application 125 generates, based on the total power saved for each processing unit, an initial system cache partition policy 304. Generating the initial system cache partition policy 304 is performed in a manner similar to that discussed above with respect to cache management application 125. In some embodiments, cache management application 125 determines the total amount of power saved for each processing unit by generating a function corresponding to the total amount of power saved for different system cache sizes available to the processing unit. Cache management application 125 formulates an optimization function based on the functions corresponding to the total amount of power saved for the different processing units. Cache management application 125 obtains values corresponding to the system cache size assigned to the different processing units by solving the optimization function under the constraint that the sum of the system cache sizes allocated to each processing unit equals the total system cache size. An example set of equations for formulating and solving the optimization function is given in equations (1A)-(3B) above.

At step 508, the cache management application 125 causes the system cache to be partitioned into a plurality of partitions 202(1)-(N) based on the initial system cache partition policy, and each partition 202 is assigned to a corresponding processing unit. In some embodiments, cache management application 125 partitions the system cache 202 and assigns each partition to a different processing unit. In some embodiments, cache management application 125 transmits the cache partition policy 304 to another application that partitions the system cache 202 and/or assigns the partitions to the different processing units.

At step 510, the cache management application 125 determines whether the system 100 has changed. Determining whether the system 100 has changed includes, for example, determining whether at least one of the frequency of DRAM 210, the frequency of the memory on which system cache 202 resides, the voltage of DRAM 210, the voltage of the memory on which system cache 202 resides, the system temperature, or workload assigned to the CPU 102 or one of the processing units 112 has changed.

If the system has changed, then at step 512, the cache management application 125 receives updated resource savings information 302 from one or more processing unit drivers. The method returns to step 504, where the cache management application 125 determines an updated total power saved for each processing unit based on the updated resource savings information 302. Cache management application 125 determines an updated system cache partition policy 304 based on the updated total power saved for each processing unit.

In sum, a cache management application partitions a system cache between multiple different processing units of a computer system. The cache management application receives resource savings information from each processing unit that indicates one or more benefits associated with each additional unit of system cache allocated to the processing unit. In some embodiments, the information indicates an amount of bandwidth saved by the processing unit for each additional unit of cache allocation. In some embodiments, the information indicates an amount of power saved by the processing unit for each additional unit of cache allocation. The amount of bandwidth saved and/or the amount of power saved is determined based on a specific performance point of the processing unit, such as a target frames-per-second for a GPU. The cache management application generates a partition policy for the system cache based on the information received from the different processing units. The partition policy indicates a number of units of system cache to assign to each processing unit. The cache management application determines a number of units of system cache to assign to each processing unit that maximizes the amount of bandwidth and/or maximizes the amount of power saved for the computer system.

At least one technical advantage of the disclosed techniques relative to the prior art is that, with the disclosed techniques, access to a system cache is more effectively shared between multiple processing units. In particular, a different portion of the system cache is assigned to each processing unit. Each processing unit has read access to other portions of the system cache, but only writes data to its assigned portion of the system cache. Accordingly, each processing unit does not write data to, or overwrite data stored in, portions of the system cache assigned to other processing units. Therefore, cached data is removed or overwritten less frequently compared to previous approaches, which also results in reduced power consumption compared to previous approaches. Furthermore, using the disclosed techniques, an optimal size of the portion of system cache assigned to each processing unit is determined, such that the overall power consumption of the system is minimized. These technical advantages provide one or more technological advancements over prior art approaches.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits.

Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for managing a system cache shared by a plurality of processing units comprising:
    receiving, for each processing unit included in the plurality of processing units, resource savings information that specifies, for different units of system cache, corresponding amounts of resources saved when the different units of system cache are allocated to the processing unit;
    determining, for each processing unit included in the plurality of processing units, corresponding amounts of power saved by the processing unit when the different units of system cache are allocated to the processing unit based on the resource savings information; and
    computing, for each processing unit included in the plurality of processing units, a number of units of system cache to allocate to the processing unit based at least on the corresponding amounts of power saved for the plurality of processing units.

2. The computer-implemented method of claim 1, wherein the resource savings information comprises bandwidth saved information that specifies, for the different units of system cache, corresponding amounts of dynamic random-access memory (DRAM) bandwidth saved when the different units of system cache are allocated to the processing unit.

3. The computer-implemented method of claim 1, wherein the resource savings information comprises power saved information that specifies, for the different units of system cache, corresponding amounts of power saved by the processing unit when the different units of system cache are allocated to the processing unit.

4. The computer-implemented method of claim 1, further comprising:
    receiving, from at least one processing unit included in the plurality of processing units, second resource savings information; and
    computing, for each processing unit included in the plurality of processing units, a second number of units of system cache to allocate to the processing unit based at least on the second resource savings information.

5. The computer-implemented method of claim 4, wherein receiving the second resource savings information is in response to a change in a workload of the at least one processing unit.

6. The computer-implemented method of claim 1, further comprising partitioning the system cache into a plurality of partitions, wherein each partition included in the plurality of partitions corresponds to a different processing unit included in the plurality of processing units, and the partition comprises the number of units of system cache to allocate to the corresponding processing unit.

7. The computer-implemented method of claim 1, wherein the plurality of processing units comprise a system on a chip.

8. A computer-implemented method for managing a system cache shared by a plurality of processing units comprising:
    receiving, for each processing unit included in the plurality of processing units, resource savings information that specifies, for different units of system cache, corresponding amounts of resources saved when the different units of system cache are allocated to the processing unit;

generating, for each processing unit included in the plurality of processing units, a total power saved function based on the resource savings information, wherein the total power saved function maps the different units of system cache to corresponding amounts of system power saved when the different units of system cache are allocated to the processing unit; and computing, for each processing unit included in the plurality of processing units, a number of units of system cache to allocate to the processing unit based at least on the total power saved function for the processing unit and on the resource savings information associated with the plurality of processing units.

9. The computer-implemented method of claim 8, wherein the resource savings information includes one or more functions that map the different units of system cache to the corresponding amounts of resources saved when the different units of system cache are allocated to the processing unit, and wherein generating the total power saved function is based on the one or more functions.

10. The computer-implemented method of claim 8, wherein computing the number of units of system cache to allocate to each processing unit comprises:

generating an optimization function based on a plurality of the total power saved functions for the plurality of processing units; and solving the optimization function to obtain, for each processing unit of the plurality of processing units, the number of units of system cache to allocate to the processing unit.

11. One or more non-transitory computer-readable media including instructions that, when executed by one or more processors, cause the one or more processors to perform the steps of:

receiving, for each processing unit included in a plurality of processing units, resource savings information that specifies, for different units of system cache, corresponding amounts of resources saved when the different units of system cache are allocated to the processing unit;

determining, for each processing unit included in the plurality of processing units, corresponding amounts of power saved by the processing unit when the different units of system cache are allocated to the processing unit based on the resource savings information; and computing, for each processing unit included in the plurality of processing units, a number of units of system cache to allocate to the processing unit based at least on the corresponding amounts of power saved for the plurality of processing units.

12. The one or more non-transitory computer-readable media of claim 11, further comprising the steps of:

receiving, from at least one processing unit included in the plurality of processing units, second resource savings information; and computing, for each processing unit included in the plurality of processing units, a second number of units of system cache to allocate to the processing unit based at least on the second resource savings information.

13. The one or more non-transitory computer-readable media of claim 11, further comprising the step of partitioning the system cache into a plurality of partitions, wherein each partition included in the plurality of partitions corresponds to a different processing unit included in the plurality of processing units, and the partition comprises the number of units of system cache to allocate to the corresponding processing unit.

14. One or more non-transitory computer-readable media including instructions that, when executed by one or more processors, cause the one or more processors to perform the steps of:

receiving, for each processing unit included in the plurality of processing units, resource savings information that specifies, for different units of system cache, corresponding amounts of resources saved when the different units of system cache are allocated to the processing unit;

generating, for each processing unit included in the plurality of processing units, a total power saved function based on the resource savings information, wherein the total power saved function maps the different units of system cache to corresponding amounts of system power saved when the different units of system cache are allocated to the processing unit; and computing, for each processing unit included in the plurality of processing units, a number of units of system cache to allocate to the processing unit based at least on the total power saved function for the processing unit and on the resource savings information associated with the plurality of processing units.

15. The one or more non-transitory computer-readable media of claim 14, wherein the resource savings information comprises bandwidth saved information that specifies, for the different units of system cache, corresponding amounts of dynamic random-access memory (DRAM) bandwidth saved when the different units of system cache are allocated to the processing unit.

16. The one or more non-transitory computer-readable media of claim 15, wherein generating the total power saved function comprises determining, for the different units of system cache, corresponding amounts of power saved based on the corresponding amounts of DRAM bandwidth saved.

17. The one or more non-transitory computer-readable media of claim 14, wherein the resource savings information comprises power saved information that specifies, for different performance levels of the processing unit and for the different units of system cache, corresponding amounts of power saved by the processing unit when the different units of system cache are allocated to the processing unit at the different performance levels.

18. The one or more non-transitory computer-readable media of claim 17, wherein generating the total power saved function comprises:

determining a current performance level of the processing unit; and determining, for the different units of system cache, the corresponding amounts of power saved by the processing unit at the current performance level of the processing unit.

19. The one or more non-transitory computer-readable media of claim 14, wherein computing the number of units of system cache to allocate to each processing unit comprises:

generating an optimization function based on a plurality of the total power saved functions for the plurality of processing units; and solving the optimization function to obtain, for each processing unit of the plurality of processing units, the number of units of system cache to allocate to the processing unit.

20. A system comprising:
a plurality of processing units;
a system cache shared by the plurality of processing units;
one or more memories storing instructions which, when executed by at least one processing unit included in the plurality of processing units, causes the processing unit to perform the steps of:
  receiving, for each processing unit included in the plurality of processing units, resource savings information that specifies, for different units of system cache, corresponding amounts of resources saved when the different units of system cache are allocated to the processing unit;
  determining, for each processing unit included in the plurality of processing units, corresponding amounts of power saved by the processing unit when the different units of system cache are allocated to the processing unit based on the resource savings information; and
  computing, for each processing unit included in the plurality of processing units, a number of units of system cache to allocate to the processing unit based at least on the corresponding amounts of power saved for the plurality of processing units.

* * * * *